United States Patent
Honda (10) Patent No.: US 7,116,633 B2
(45) Date of Patent: Oct. 3, 2006

(54) PACKET SWITCHING SYSTEM AND METHOD

(75) Inventor: Masahiko Honda, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 970 days.

(21) Appl. No.: 09/825,941

(22) Filed: Apr. 5, 2001

(65) Prior Publication Data

US 2001/0038607 A1   Nov. 8, 2001

(30) Foreign Application Priority Data

Apr. 6, 2000   (JP) ............................. 2000-104707

(51) Int. Cl.
| | |
|---|---|
| H04J 1/16 | (2006.01) |
| H04J 3/14 | (2006.01) |
| H04L 12/50 | (2006.01) |
| H04L 12/28 | (2006.01) |
| H04L 12/56 | (2006.01) |
| H04Q 11/00 | (2006.01) |

(52) U.S. Cl. ........................ 370/218; 370/386; 370/422
(58) Field of Classification Search ................ 370/218, 370/219, 220, 227, 228, 229, 381, 383, 395.21, 370/395.42, 396, 412, 413, 443, 444, 386
See application file for complete search history.

(56) References Cited

U.S. PATENT DOCUMENTS

| | | | |
|---|---|---|---|
| 5,398,235 A | | 3/1995 | Tsuzuki et al. |
| 5,459,724 A | * | 10/1995 | Jeffrey et al. ................ 370/398 |
| 6,091,709 A | * | 7/2000 | Harrison et al. ............. 370/235 |
| 6,269,077 B1 | * | 7/2001 | Matsumura et al. ......... 370/218 |
| 6,400,718 B1 | * | 6/2002 | Yamada et al. ........... 370/395.3 |
| 6,430,153 B1 | * | 8/2002 | Hughes et al. ........... 370/230.1 |
| 6,487,169 B1 | * | 11/2002 | Tada ........................... 370/219 |
| 6,535,479 B1 | * | 3/2003 | Ikematsu ..................... 370/220 |
| 6,563,837 B1 | * | 5/2003 | Krishna et al. .............. 370/413 |
| 6,667,959 B1 | * | 12/2003 | Hebb et al. .................. 370/241 |
| 6,721,324 B1 | * | 4/2004 | Shinohara ................. 370/395.1 |
| 6,738,381 B1 | * | 5/2004 | Agnevik et al. .......... 370/395.7 |
| 2001/0050916 A1 | * | 12/2001 | Krishna et al. .............. 370/419 |
| 2003/0072316 A1 | * | 4/2003 | Niu et al. .................... 370/412 |

FOREIGN PATENT DOCUMENTS

| | | |
|---|---|---|
| JP | 2-246646 A | 10/1990 |
| JP | 5-7213 | 1/1993 |
| JP | 6-6372 A | 1/1994 |
| JP | 11-17696 A | 1/1999 |

* cited by examiner

*Primary Examiner*—Chirag Shah
(74) *Attorney, Agent, or Firm*—Harrity Snyder LLP

(57) ABSTRACT

A packet switching system capable of ensuring the sequence and continuity of packets and further compensating for delays in transmission is disclosed. Each of two redundant switch sections has a high-priority queue and a low-priority queue for each of output ports. A high-priority output selector selects one of two high-priority queues corresponding to respective ones of the two switch sections to store an output of the selected one into a high-priority output queue. A low-priority output selector selects one of two low-priority queues corresponding to respective ones of the two switch sections to store an output of the selected one into a low-priority output queue. The high-priority and low-priority output selectors are controlled depending on a system switching signal and a packet storing status of each of the high-priority and low-priority queues.

13 Claims, 6 Drawing Sheets

PACKET SWITCHING SYSTEM AND METHOD

BACKGROUND OF THE INVENTION

1. Field of the Invention

The present invention relates to packet switching techniques, and in particular to packet switching system and method ensuring traffic quality.

2. Description of the Related Art

LANs (local-area networks) and IP(Internet Protocol)-based private networks have been widely used in companies and universities and are undergoing further development to carrier-class public networks. As the demands for telephony traffic and online trading transactions are growing, real-time and reliable traffic transfer becomes more important. In such a background, there have been proposed packet switching techniques allowing Quality of Service (QoS) guarantees to be maintained.

An ATM (asynchronous transfer mode) cell switching system guaranteeing the sequence and continuity of cells has been disclosed in Japanese Patent Application Unexamined Publication No. 5-7213. More specifically, the conventional switching system is provided with working and reserved ATM cell switches, which are selectively connected to an outgoing line by a system selector. When the working ATM cell switch is switched to the reserved ATM cell switch, the system switching is performed after all the cells staying in the working ATM cell switch have been completely forwarded to the outgoing line. This cell switching technique can be also applied to IP packet switching systems.

In the case of traffic flows requiring real time with little delay, it is necessary to pass the packets through the switch inrelatively short time. On the other hand, some traffic flows that do not necessitate real time may be permitted to be transferred with relatively long delay.

According to the above-described prior art (Japanese Patent Application Unexamined Publication No. 5-7213), however, the system switching from the working ATM cell switch to the reserved ATM cell switch is performed after all the cells abiding in the working ATM cell switch have been completely forwarded to the outgoing line. Therefore, traffic requiring real time is kept waiting in the reserved ATM cell switch until the working ATM cell switch have completely forwarded the abiding cells to the outgoing line. This may not ensure required QoS.

In general, in the case of real-time traffic, an end terminal is provided with a buffer for absorbing variations in arrival time of packets. However, it is necessary for packets to arrive within a predetermined delay time. For example, telephone conversation cannot be don smoothly without limiting a delay time to at most several hundred milliseconds. If a packet is delayed by a time interval longer than an absorbable time period, then the packet is assumed not to arrive and is interpolated, or equivalently loss of packet.

SUMMARY OF THE INVENTION

An object of the present invention is to provide a packet switching system and method capable of ensuring the sequence and continuity of packets and further compensating for delays in transmission.

Another object of the present invention is to provide a packet switching method and system capable of maintaining QoS guarantees for individual traffic flows including traffic that requires small delays and traffic that does not require small delays.

According to the present invention, a redundant system having two switch routes comprises: N (where, $N \geq 1$) input selectors, (each of which selects one of the two switch routes to connect N input lines to the selected switching route depending on a system switching signal); two switch sections provided for respective ones of the two switch routes (each of the switch sections having N input ports and N output ports and comprising N buffers, where each switch section comprises M (where, $M \geq 2$) priority queues for storing input packets classified under M priorities); M priority output queues corresponding to respective ones of the M priorities; an output selector for selecting one of two priority queues, corresponding to the two switch sections, for each of the M priorities, to store an output of the selected one, priority queue, into a corresponding one of the M priority output queues; and a controller for instructing the output selector to select one of the two priority queues, for each of the M priorities, corresponding to respective ones of the two switch sections, where instructing depends on the system switching signal and a packet storing status of each of the M priority queues.

When the one of the two switch routes is switched to the other switch route, as indicated by the system switching signal, the controller monitors a packet storing status of each of the M priority queues; and if the one of the two priority queues (corresponding to respective ones of the two switch sections) becomes empty, then the controller instructs the output selector to select the other of the two priority queues to store an output of the selected one into a corresponding one of the M priority output queues.

Each of the switch sections may further include a readout controller controlling a packet reading sequence of the M priority queues for each of the N buffers such that priority in packet reading is given to a higher priority queue.

The controller may instruct the output selector to sequentially select the other of the two priority queues for each of the M priorities in descending order of priority.

According to an aspect of the present invention, a packet switching system having two switch routes, comprises: N (where, $N \geq 1$) input selectors, each of which selects one of the two switch routes to connect N input lines to the selected switch route depending on a system switching signal; two switch sections provided for respective ones of the two switch routes, each of the switch sections having N input ports and N output ports and comprising N buffers, each of which comprises a high-priority queue for storing input packets having a high priority; and a low-priority queue for storing input packets having a low priority; a high-priority output selector for selecting one of two high-priority queues corresponding to respective ones of the two switch sections; a low-priority output selector for selecting one of two low-priority queues corresponding to respective ones of the two switch sections: a high-priority output queue for storing an output of the selected one of the two high-priority queues; a low-priority output queue for storing an output of the selected one of the two low-priority queues: and a controller controlling the high-priority and low-priority output selectors depending on the system switching signal and a packet storing status of each of the high-priority and low-priority queues.

Each of the switch sections may further include a readout controller controlling a packet reading sequence of the high-priority and low-priority queues for each of the N buffers such that priority in packet reading is given to the high-priority queue. The readout controller may start reading out low-priority packet stored in the low-priority queue after all high-priority packets stored in the high-priority queue have been completely read out. Alternatively, the readout controller may control a packet reading sequence of the high-priority and low-priority queues for each of the N buffers such that m high-priority packets are read out from the high-priority queue and n low-priority packets are read out from the low-priority queue, wherein m is set to be greater than n.

According to another aspect of the present invention, a packet switching method includes the steps of: a) distributing input packets into M (M>=2) priority queues, which are classified under N priorities for each of the N buffers; and b) selecting one of two priority queues for each of the M priorities corresponding to respective ones of the two switch sections to store an output of the selected one into a corresponding one of the M priority output queues, depending on the system switching signal and a packet storing status of each of the M priority queues.

The step (b) may include the steps of: when the one of the two switch routes is switched to the other by the system switching signal, monitoring a packet storing status of each of the M priority queues; and when the one of the two priority queues corresponding to respective ones of the two switch sections becomes empty, selecting the other of the two priority queues to store an output of the selected one into a corresponding one of the M priority output queues.

According to still another aspect of the present invention, a packet switching method includes the steps of: a) distributing input packets into M (M>=2) priority queues, which are classified under M priorities for each of the N buffers; and b) sequentially switching between two priority queues for each of the M priorities corresponding to respective ones of the two switch sections to store an output of a selected one into a corresponding one of the M priority output queues, in descending order of priority.

As described above, in the case of high-priority and low-priority queues, after all packets stored in the high priority queue provided in a switch section of a working switch route have been completed output, the output selector switches from the working switch route to a reserved switch route to store packets into a high-priority output queue independently of a packet storing status of the low-priority queue. Accordingly, traffic requiring small delay can be switched rapidly, avoiding deterioration in traffic delay property. As a result, the present invention has the following advantages:

1) system switching in redundant system can be performed without loss or duplication of packet; and 2) system switching can be performed taking into account the priority of a packet and thereby the real-time traffic flow can be switched with little delay.

DESCRIPTION OF THE PREFERRED EMBODIMENT

Figure 1:
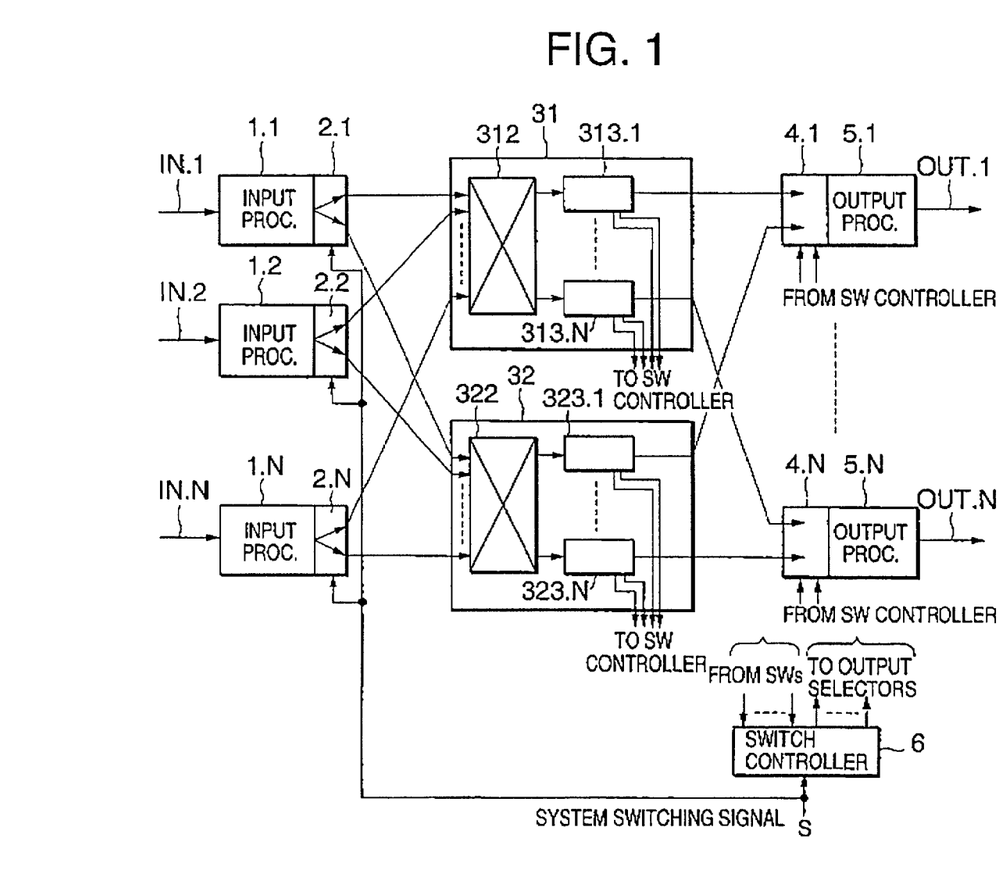
FIG. 1 is a block diagram showing a packet switching system according to an embodiment of the present invention.

As shown in FIG. 1, a packet switching system according to an embodiment of the present invention is provided with N (N is an integer greater than 0) input processors 1.1 to 1.N, which are connected to respective ones of N input lines IN.1 to IN.N. The respective input processors 1.1 to 1.N are connected to N input selector switches 2.1 to 2.N, each of which outputs a packet of data to a selected one of two switch sections 31 and 32.

Each of the switch sections 31 and 32 has N output ports corresponding to respective ones of N output lines OUT.1 to OUT.N. More specifically, a pair of corresponding output ports of the switch sections 31 and 32 are connected to a corresponding one of N output selectors 4.1 to 4.N, which are Connected to N output processors 5.1 to 5.N, respectively, A switch controller 6 controls selection operations of the output selectors 4.1 to 4.N based on status signals received from the switch sections 31 and 32, which will be described later.

The respective input processors 1.1 to 1.N perform input processing of packets received from the input lines IN.1 to IN.N. The input processing includes: counting the number of packets; discarding packets going over the speed limit: checking the priority of a packet; and searching for destination port. The input selector switch, when receiving a packet from a corresponding input processor, outputs the packet to a selected one of the switch sections 31 and 32.

The switch section 31 includes an N×N switch fabric 312. which may be a crossbar switch or configured in bus form. The N input ports of the switch fabric 312 are connected to respective ones of the input selector switches 2.1 to 2.N. The N output ports of the switch fabric 312 are connected to respective ones of N output buffers 313.1 to 313.N. Similarly, the switch section 32 Includes an N×N switch fabric 322, which may be a crossbar switch or configured in bus form. The N input ports of the switch fabric 322 are connected to respective ones of the input selector switches 2.1 to 2.N. The N output ports of the switch fabric 322 are connected to respective ones of N output buffers 323.1 to 323.N.

In this embodiment, each of the output buffers 313.1 to 313.N (or 323.1 to 323.N) includes M priority queues each corresponding to different priorities of packets, where M is an integer greater than 1. The priority of a packet indicates how fast the packet passes through the switch. In other words, a packet with higher priority is given priority in transfer to its destination port. A packet that requires a shorter delay time is a high-priority packet and one that does not require a shorter delay time is a low-priority packet. Therefore, a high-priority packet is expected to pass through the switch faster than a low-priority packet.

Each of the output processors 5.1 to 5.N receives a packet from a corresponding output selector and performs necessary processing of the packet to output it to a corresponding output line. The processing performed in the output processor includes counting the number of outgoing packets and controlling the transfer rate.

Hereinafter, it is assumed for simplicity that cach of the output buffers 313.1 to 313.N (or 323.1 to 323.N) includes two priority queues: high-priority queue and low-priority queue. A high-priority packet is stored in the high-priority queue and a low-priority packet is stored in the low-priority queue in each output buffer.

Output Buffer

Since the output buffers 313.1 to 313.N (or 323.1 to 323.N) have the same circuit configuration, one of them will be described as a typical example with reference to FIG. 2.

Figure 2:
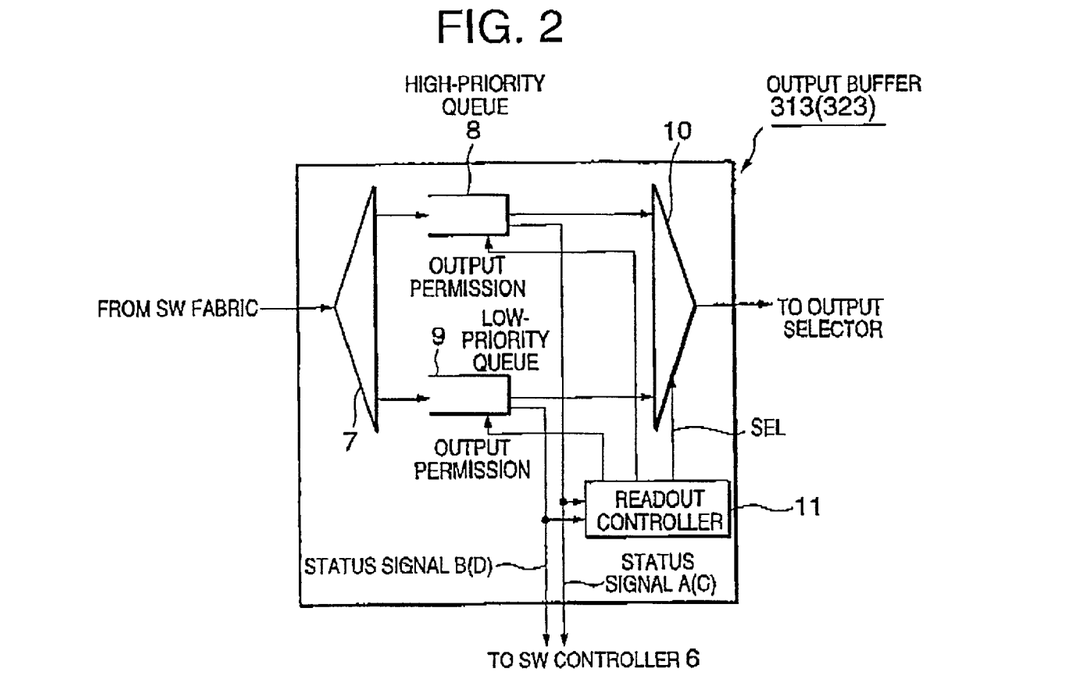
FIG. 2 is a block diagram showing an output buffer having a high-priority queue and a low-priority queue in the embodiment.

Referring to FIG. 2, the output buffer is provided with a distributor 7, a high-priority queue 8, a low-priority queue 9, a queue-output selector 10, and a readout controller 11.

The distributor 7 receives packets from a corresponding output port of the switch fabric and discriminates between a high-priority packet and a low-priority packet. The high-priority packet is stored in a high-priority queue 8 and the low-priority packet is stored in a low-priority queue 9. The distributor 7 does not necessarily check the header information of each packet to determine its priority. Each of the input processors 1.1 to 1.N reads the header of a packet to determine whether the packet is a high-priority packet or a low-priority packet and then adds to the packet internally effective bit information indicating whether the packet is a high-priority packet or a low-priority packet. Therefore, only by looking at the added bit information, the distributor 7 can discriminate between a high-priority packet and a low-priority packet.

The high-priority queue 8 and the low-priority queue 9 output respective status signals to the readout controller 11 and the switch controller 6. The status signal of the high-priority queue 8 or the low-priority queue 9 indicates an empty status when no packet is stored therein.

The high-priority queue 8 and the low-priority queue 9 output respective packets to the queue-output selector 10 depending on output permission signals received from the readout controller 11. More specifically, only when the output permission signal is received, a corresponding queue outputs a stored packet to the queue-output selector 10. If the output permission signal is not received, then the corresponding queue does not output any packet to the queue-output selector 10.

The readout controller 11 outputs the output permission signals to respective ones of the high-priority queue 8 and the low-priority queue 9 and further outputs a selection signal SEL to the queue-output selector 10, depending on the status signals received from respective ones of the high-priority queue 8 and the low-priority queue 9. The queue-output selector 10 selects one of the outputs of the high-priority queue 8 and the low-priority queue 9 depending on the selection signal SEL. For example, when the readout controller 11 outputs the output permission signal to the high-priority queue 8, the readout controller 11 outputs the selection signal SEL to the queue-output selector 10 so that the output of the high-priority queue 8 is selected. Similarly, when the output permission signal output to the low-priority queue 9, the queue-output selector 10 selects the output of the low-priority queue 9. A packet selected by the queue-output selector 10 in an output buffer is output to a corresponding output selector.

EXAMPLE I OF READOUT CONTROL

In the case where one of the high-priority queue 8 and the low-priority queue 9 does not output the empty status signal, in other words, the one stores at least one packet and the other is empty, the readout controller 11 outputs the output permission signal only to the one of the high-priority queue 8 and the low-priority queue 9 and thereby the one is permitted to output a packet to the queue-output selector 10.

In the case where neither the high-priority queue 8 nor the low-priority queue 9 outputs the empty status signal, the readout controller 11 outputs the output permission signal only to the high-priority queue 8. Accordingly, when the high-priority queue 8 and the low-priority queue 9 both store at least one packet, only the high-priority queue 8 is permitted to output a packet to the queue-output selector 10 and the low-priority queue 8 is not permitted to output a packet until the high-priority queue 8 has completely output the abiding packets. In other words, after the high-priority queue 8 becomes empty, that is, the high-priority queue 8 outputs the empty status signal, the output permission signal is output to the low-priority queue 8.

According to this readout control method, in the case of the high-priority queue 8 storing packets, the packets stored in the high-priority queue 8 are given priority in transfer independently of the status of the low-priority queue 9. After all the abiding packets have been completely transferred from the high-priority queue 8, packets stored in the low-priority queue 9 are output to the queue-output selector 10.

EXAMPLE II OF READOUT CONTROL

In the case where one of the high-priority queue 8 and the low-priority queue 9 does not output the empty status signal, in other words, the one stores at least one packet and the other is empty, the readout controller 11 outputs the output permission signal only to the one of the high-priority queue 8 and the Low-priority queue 9 and thereby the one is permitted to output a packet to the queue-output selector 10.

In the case where neither the high-priority queue 8 nor the low-priority queue 9 outputs the empty status signal, the readout controller 11 outputs the output permission signal to the high-priority queue 8 so that M packets are output from the high-priority queue 8 and outputs the output permission signal to the low-priority queue 9 so that N packets are output from the low-priority queue 9, where M>N. Accordingly, when the high-priority queue 8 and the low-priority queue 9 both store at least one packet, packets are read out from the high-priority queue 8 more frequently than from the low-priority queue 9, therefore, compared with low-priority packets, high-priority packets pass through the switch with smaller delay.

Although the readout control is performed based on the number of packets transferred, it can be also performed based on the number of bytes of packets transferred.

Either of the above-described readout control methods can be employed in the present invention. Another readout control method of giving priority in transfer to high-priority packets may be employed.

Output Selector

Since the output selectors 4.1 to 4.N have the same circuit configuration, one of them will be described as a typical example with reference to FIG. 3.

Figure 3:
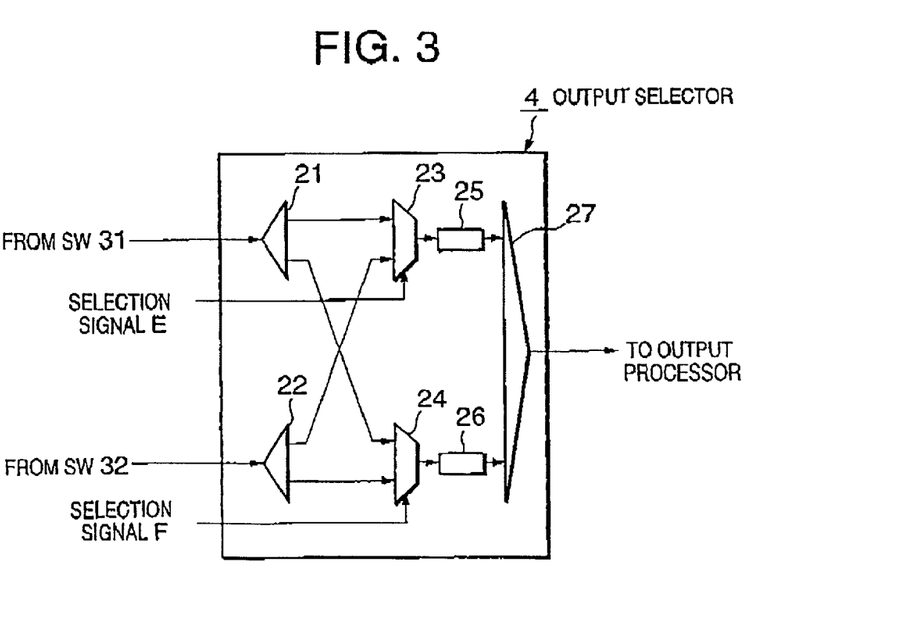
FIG. 3 is a block diagram showing an output selector in the embodiment.

Referring to FIG. 3, the output selector is provided with distributors 21 and 22, which are connected to respective ones of the switch sections 31 and 32. A high-priority packet selector 23 is connected to the outputs of the distributors 21 and 22 and outputs only high-priority packets to a high-priority queue 25. A low-priority packet selector 24 is connected to the outputs of the distributors 21 and 22 and outputs only low-priority packets to a low-priority queue 26.

The outputs of the high-priority queue 25 and the low-priority queue 26 are connected to a readout section 27.

The distributor 21 receives packets from the switch section 31 and discriminates between a high-priority packet and a low-priority packet. The high-priority packet is output to be high-priority packet selector 23 and the low-priority packet is output to the low-priority packet selector 24. Similarly, the distributor 22 receives packets from the switch section 32 and discriminates between a high-priority packet and a low-priority packet. The high-priority packet is output to the high-priority packet selector 23 and the low-priority packet is output to the low-priority packet selector 24. As the case of the distributor 7 in the output buffer as shown in FIG. 2, the distributors 21 and 22 can discriminate between a high-priority packet and a low-priority packet only by looking at the added bit information of the packet.

The high-priority packet selector 23 selects one of high-priority packets received from the switch sections 31 and 32 to output it to the high-priority queue 25 depending on a selection signal E received from the switch controller 6. Similarly, the low-priority packet selector 24 selects one of low-priority packets received from the switch sections 31 and 32 to output it to the low-priority queue 26 depending on a selection signal F received from the switch controller 6. In other words, the high-priority packet selector 23 finally determines the switching timing of high-priority packet between she switch sections 31 and 32 and the low-priority packet selector 24 finally determines the switching timing of low-priority packet between the switch sections 31 and 32. In this way, high-priority packets stored in the high-priority queue 25 and low-priority packets stored in the low-priority queue 26 are read out and output to a corresponding output processor by the readout section 27.

Switch Controller

Figure 4:
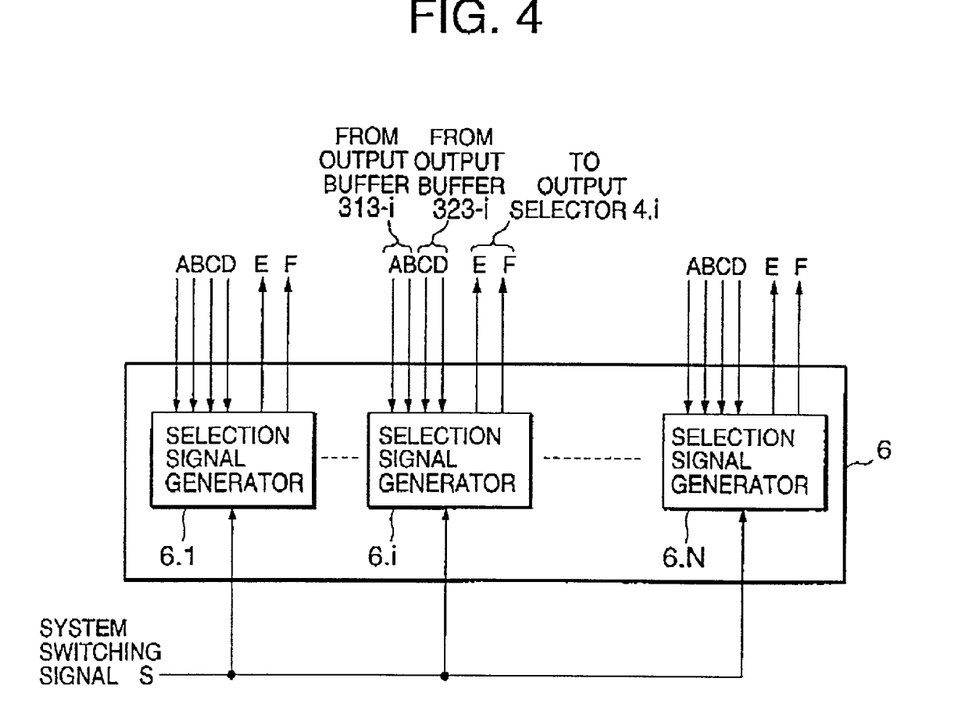
FIG. 4 is a block diagram showing a switch controller in the embodiment.

Referring to FIG. 4, the switch Controller 6 includes N selection signal generators 6.1 to 6.N, which correspond to the output selectors 4.1 to 4.N, respectively. The selection signal generators 6.i (i is an integer: $1 \leq i \leq N$) receives high-priority and low-priority status signals A and B from the output buffer 313.i of the switch section 31, high-priority and low-priority status signals C and D from the output buffer 323.1 of the switch section 32, and a system switching signal S instructing the switching between the switch sections 31 and 32. The selection signal generators 6.i generates the selection signals E and F based on the status signals A, B, C, and D and the system switching signal S to output them to the output selector 4.i.

Selection Signal Generation

Figure 5:
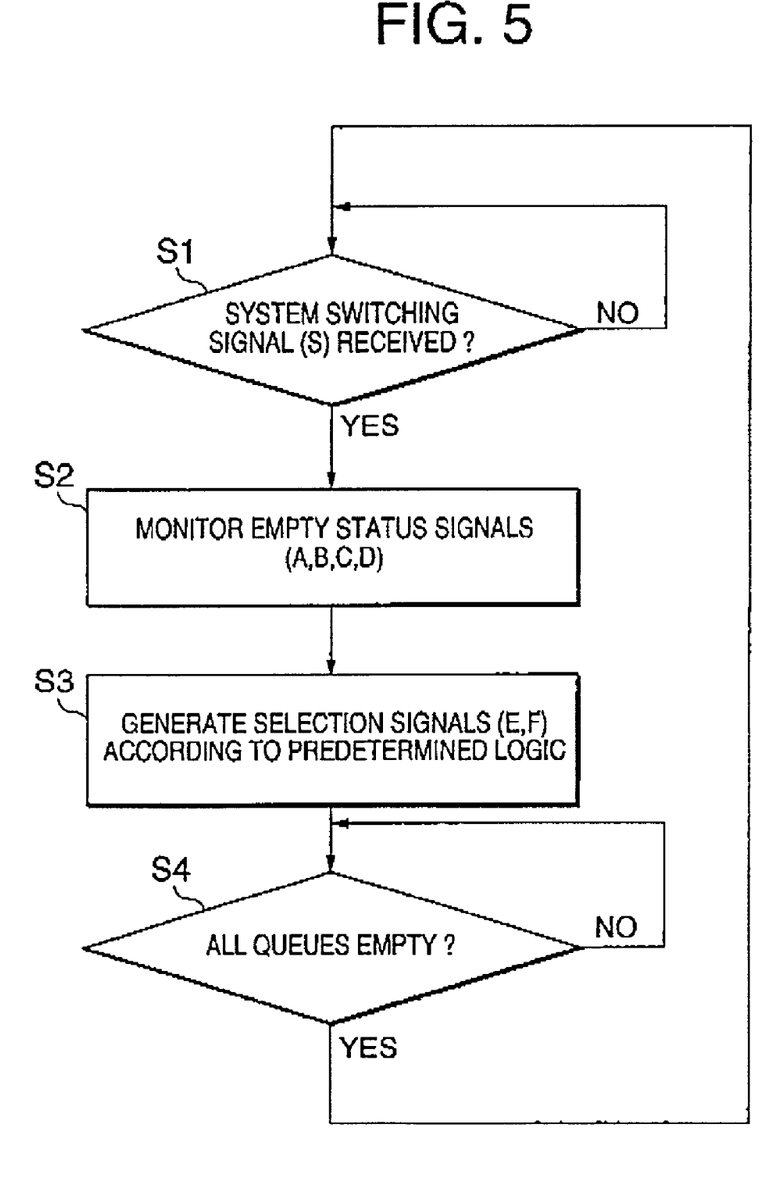
FIG. 5 is a flow chart showing an operation of forming a selection signal in the embodiment.

Referring to FIG. 5, the selection signal generator 6.i determines whether the system switching signal S is received (step S1). When the system switching signal S is received (YES at step S1), the selection signal generator 6.i monitors the high-priority and low-priority status signals A and B of the output buffer 313.i and the high-priority and low-priority status signals C and D of the output buffer 323.i (step S2). The selection signal generators 6.i generates selection signals E and E according to predetermined logic as shown in Table (step S3). Thereafter, it is determined whether the high-priority and low-priority queues of a corresponding output buffer become empty (step S4) and, if all queues are empty, then control goes back to the step S1.

TABLE

| | Input | | | | Output | |
|---|---|---|---|---|---|---|
| | Working queue status | | Reserved queue status | | High-pr selection | Low-pr selection |
| S | High-pr A | Low-pr B | High-pr C | Low-pr D | signal E | signal F |
| 1 | 0 → 1 | — | — | — | 0 → 1 | — |
| | — | 0 → 1 | — | — | — | 0 → 1 |
| 0 | — | — | 0 → 1 | — | 1 → 0 | — |
| | — | — | — | 0 → 1 | — | 1 → 0 |

In the above Table, when the system switching signal S=1, the selection signal generator 6.i is instructed to switch to the reserved system (switch section 32) and, when S=0, to the working system (switch section 31). In the case of S=1, for example, when the high-priority queue 8 of the output buffer 313.1 becomes empty, the high-priority queue status signal A is changed from 0 to 1 and the selection signal generators 6.1 changes the selection signal E from 0 to 1. When the selection signal E=1, the high-priority packet selector 23 of the output selector 4.1 selects the output of the distributor 22 corresponding to the reserved switch section 32 (see FIG. 3). Accordingly, a high-priority packet passing through the switch section 32 is stored in the high-priority packet queue 25 in the output selector 4.1.

In the case of S=1, if the low-priority queue 9 of the output buffer 313.1 becomes empty, the low-priority queue status signal B is changed from 0 to 1 and the selection signal generators 6.1 changes the selection signal F from 0 to 1. When the selection signal F=1, the low-priority packet selector 24 of the output selector 4.1 selects the output of the distributor 22 corresponding to the reserved switch section 32 (see FIG. 3). Accordingly, a low-priority packet passing through the switch section 32 is stored in the low-priority packet queue 26 in the output selector 4.1.

In this manner, each of the selection signal generators 6.1 to 6.N of the switch controller 6 generates selection signals E and F based on the status signals A, B. C, and D and the system switching signal S to control the switching of the high-priority and low-priority packet selectors 23 and 24 of a corresponding output selector.

Packet Switching Operation

Hereafter, a packet switching operation in the redundant system as shown in FIG. 1 will be described with reference to FIGS. 6–8. It is assumed for simplicity that a packet received from the input line IN.1 is switched from the working switch section 31 to the reserved switch section 32 to be forwarded to the output line OUT.1.

The output buffer 313.1 of the switch section 31 receives packets from a corresponding output port of the switch fabric and selectively stores the packets in the high-priority queue 8 and the low-priority packet 9 depending on the priority of each packet. The queue-output selector 10 reads out packets from a selected one of the high-priority queue 8 and the low-priority packet 9 according to a predetermined readout control method as described before. The readout packet is output to the output selector 4.1.

Figure 6:
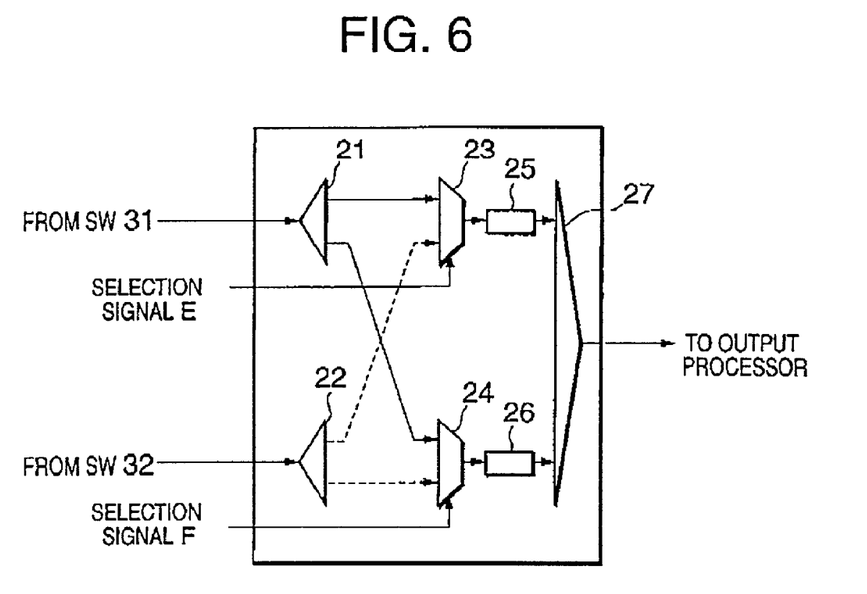
FIGS. 6–8 are block diagrams each showing the output selector for explanation of a packet switching operation according to the embodiment.

As shown in FIG. 6, the output selector 4.1 is set to such a status that the high-priority packet selector 23 and the low-priority packet selector 24 both select the outputs of the distributor 21 corresponding to the working switch section 31. Therefore, a high-priority packet output from the distributor 21 is stored in the high-priority packet queue 25 through the selector 23 and a low-priority packet output from the distributor 21 is stored in the low-priority packet queue 26 through the selector 24.

Assuming that the system switching signal S is changed to 1 in this status, the input selector switch 2.1 switches the forwarding destination of a received packet from the working switch section 31 to the reserved switch section 32 (see FIG. 1). After having switched to the reserved switch section 32, packets are selectively stored in the high-priority queue 8 and the low-priority packet 9 in the output buffer 323.1 of the reserved switch section 32 depending on the priority of each packet. At the same time, the packets stored in the buffers 8 and 9 of the working switch section 31 continue to be read out according to the predetermined readout control method and are stored in a corresponding one of the high-priority packet queue 25 and the low-priority packet queue 26.

When the switch controller 6 determines that the system switching signal S=1 is received (see step S1 of FIG. 5), the switch controller 6 monitors the high-priority queue and low-priority queue status signals A and B (step S2 of FIG. 5).

In the case where both the high-priority queue 8 and the low-priority packet 9 of the output buffer 313.1 store packets, the packets stored in the high-priority queue 8 are given priority in transfer as described before. When the high-priority queue 8 becomes empty and thereby outputs the empty status signal to the switch controller 6, the selection signal generator 6.1 of the switch controller 6 generates the selection signal E=1 according to the logic shown in the Table (step S3 of FIG. 5).

Figure 7:
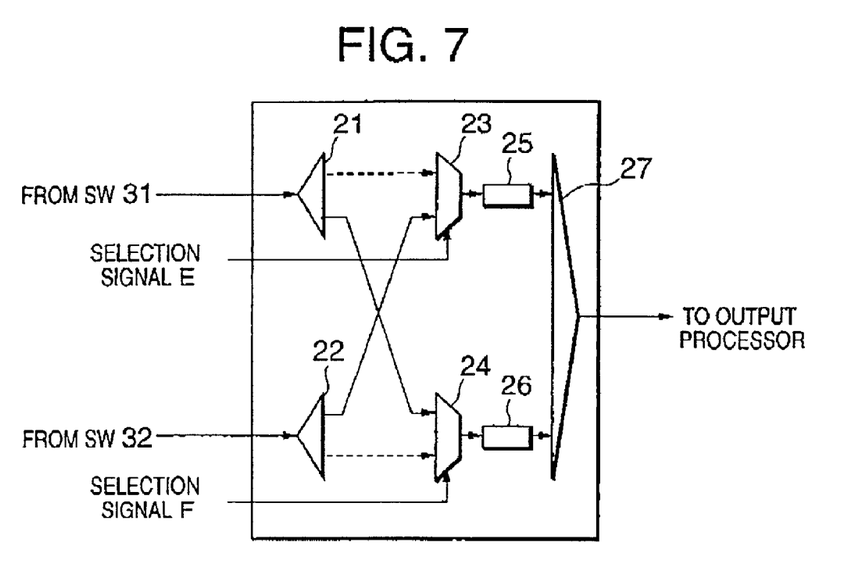

As shown in FIG. 7, when receiving the selection signal E=1, the selector 23 of the output selector 4.1 is changed to such a status that a high-priority packet is received from the distributor 22 corresponding to the reserved switch section 32. Accordingly, the high-priority packets stored in the high-priority queue 8 of the output buffer 323.1 in the reserved switch section 32 are distributed to the selector 23 by the distributor 22 and stored in the high-priority packet queue 25. In other words, from the viewpoint of a high-priority packet, a switch to be passed through is switched from the working switch section 31 to the reserved switch section 32. Therefore, when the system is switched from working to reserved, a high-priority packet passes through the switch without staying in the reserved switch section 32 for a long time, resulting in a small amount of delay.

When the low-priority queue 9 becomes empty and thereby outputs the empty status signal to the switch controller 6, the selection signal generator 6.1 of the switch controller 6 generates the selection signal F=1 according to the logic shown in the Table (step S3 of FIG. 5).

Figure 8:
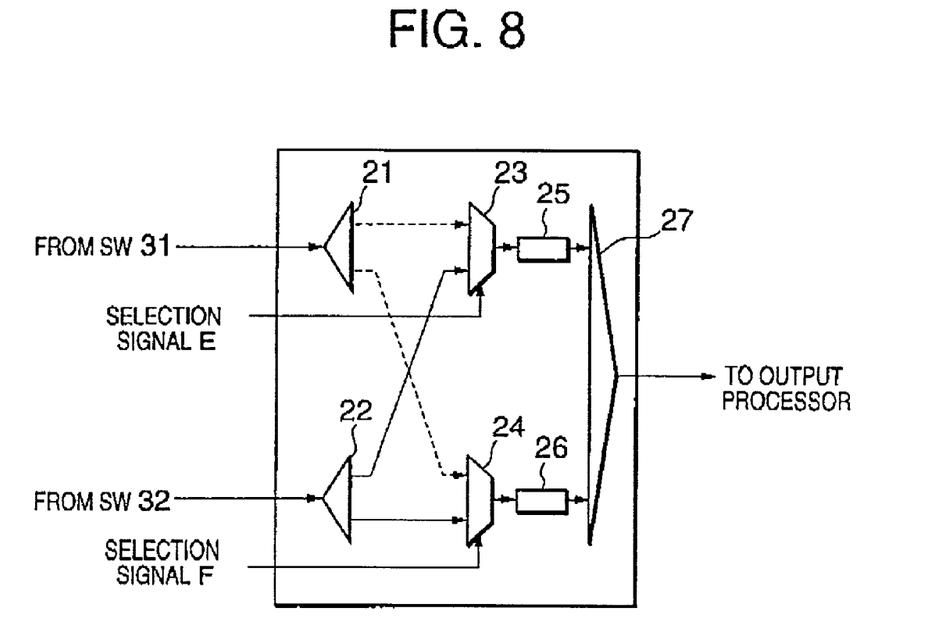

As shown in FIG. 8, when receiving the selection signal F=1, the selector 24 of the output selector 4.1 is changed to such a status that a low-priority packet is received from the distributor 22 corresponding to the reserved switch section 32. Accordingly, the low-priority packets stored in the low-priority queue 9 of the output buffer 323.1 in the reserved switch section 32 are distributed to the selector 24 by the distributor 22 and stored in the low-priority packet queue 26. In other words, from the viewpoint of a low-priority packet, a switch to be passed through is switched from the working switch section 31 to the reserved switch section 32.

In this manner, the switching timing between working and reserved switch sections varies depending on the priority of a packet. More specifically, the higher the priority of a packet, the earlier the switching timing. Therefore, traffic flows requiring real-time transfer can be switched with little delay.

The above-described operation is performed in each of the output buffers. In this embodiment, two kinds of queues (high-priority and low-priority queues) are provided for each output buffer. It is possible to define three or more priority classes by providing three or more kinds of queues in each output buffer.

Although the buffer is provided at the output side of the switch fabric in the above embodiment, it is possible to provide the buffer at the input side of the switch fabric.

The invention claimed is:

1. A redundant system having two switch routes, comprising:
   N, with N greater than or equal to one, input selectors, each for receiving an input line and for connecting the received input line to one of the two switch routes based on a system switching signal;
   a switch section for each one of the two switch routes, each of the switch sections having N input ports and N output ports, and N buffers that each further include M, with M greater than or equal to two, priority queues for storing packets having different priorities;
   an output selector for selecting one of the M priority queues from one of the N buffers of one of the two switch sections; and
   a controller configured to receive status signals from both of the switch sections that include information relating to a packet storing status of the M priority queues and, based on the status signals, control the output selector to select the one of the M priority queues, the controller additionally generating the system switching signal.

2. The redundant system according to claim 1, wherein when one of the two switch routes is switched to an other switch route, the controller monitors a packet storing status of each of the M priority queues and, when one of the M priority queues corresponding to respective ones of the switch sections becomes empty, then the controller instructs the output selector to select another one of the M priority queues to store an output of the selected one of M priority queues in one of the switch sections into a corresponding one of the M priority output queues.

3. The redundant system according to claim 2, wherein each of the switch sections further comprises:
   a readout controller controlling a packet reading sequence of the M priority queues for each of the N buffers such that priority in packet reading is given to a higher priority queue.

4. The redundant system according to claim 2, wherein the controller instructs the output selector to sequentially select the M priority queues in descending order of priority.

5. A packet switching system having two switch routes, comprising:
   N, with N greater than or equal to one, input selectors, each of which selects one of the two switch routes to connect N input lines to the selected switch route based on a system switching signal;
   a switch section provided for each of the two switch routes, each of the switch sections having N input ports and N output ports and comprising N buffers, each of the N buffers further including
      a high-priority queue for storing input packets having a high priority; and
      a low-priority queue for storing input packets having a low priority;

a high-priority output selector coupled to the high-priority queues in each of the switch sections;

a low-priority output selector coupled to the low-priority queues in each of the switch sections;

a high-priority output queue for storing an output of the high-priority output selector;

a low-priority output queue for storing an output of the low-priority output selector; and a controller configured to generate the system switching signal and receive status signals from each of the two switch sections that include information relating to a storage status of the high-priority queues and the low-priority queues, the controller controlling the high-priority output selectors and the low-priority output selectors depending on the status signals.

6. The packet switching system according to claim 5, wherein when one of the two switch routes is switched to an other of the two switch routes the controller monitors a packet storing status of each of the high-priority and low-priority queues and, if one of the high-priority queues corresponding to respective ones of the two switch sections becomes empty, then the controller instructs a high-priority output selector to select an other of the high-priority queues to store an output of the selected high priority queue into the high-priority output queue.

7. The packet switching system according to claim 6, wherein each of the switch sections further comprises:

a readout controller controlling a packet reading sequence of the high-priority and low-priority queues for each of the N buffers such that priority in data unit reading is given to the high-priority queue.

8. The packet switching system according to claim 7, wherein the readout controller starts reading out the low-priority data units stored in the low-priority queue after all of the high-priority data units stored in the high-priority queue have been completely read out.

9. The packet switching system according claim 7, wherein the readout controller controls a data unit reading sequence of the high-priority and low-priority queues for each of the N buffers such that m high-priority packets are read out from the high-priority queue and n low-priority packets are read out from the low-priority queue, wherein m is set to be greater than n.

10. A switching system comprising:

a plurality of input selector switches each configured to be connected to an input line and each receiving a system switching signal;

a first switch section and a second switch section connected to the plurality of input selector switches, one of the first switch section or the second switch section receiving packets from the plurality of input selector switches in response to the system switching signal indicating that either the first switch section or the second switch section is active, the first and second switch sections each including a buffer corresponding to each of the input selector switches, each of the buffers further including a plurality of priority queues for storing different priority packets from corresponding ones of the input selector switches;

a plurality of output selectors each connected to one of the buffers from the first and second switch sections; and a controller, configured to generate the system switching signal and to receive status signals from the first switch section and the second switch section that include information relating to a packet storage state of the plurality of priority queues of the first switch section and the second switch section and being used by the controller to control the plurality of output selectors.

11. The system of claim 10, wherein the plurality of output selectors are controlled to receive packets from one of the priority queues corresponding to the buffer to which an output selector is connected.

12. The system of claim 10, wherein the input selector switches are each connected to an input line via an input processor.

13. The system of claim 10, wherein a number of the output selectors is equal to a number of the input selector switches.

* * * * *